United States Patent
Dorum et al.

(10) Patent No.: US 9,383,212 B2
(45) Date of Patent: Jul. 5, 2016

(54) BEZIER CURVES FOR ADVANCED DRIVER ASSISTANCE SYSTEM APPLICATIONS

(71) Applicant: Navteq B.V., Veldhoven (NL)

(72) Inventors: Ole Henry Dorum, Chicago, IL (US); Marianna Gnedin, Long Grove, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 14/225,749

(22) Filed: Mar. 26, 2014

(65) Prior Publication Data

US 2014/0222331 A1  Aug. 7, 2014

Related U.S. Application Data

(62) Division of application No. 12/540,665, filed on Aug. 13, 2009, now Pat. No. 8,725,474.

(60) Provisional application No. 61/101,758, filed on Oct. 1, 2008.

(51) Int. Cl.
- G06G 7/48 (2006.01)
- G01C 21/30 (2006.01)
- G01C 21/32 (2006.01)

(52) U.S. Cl.
CPC .............. *G01C 21/30* (2013.01); *G01C 21/32* (2013.01)

(58) Field of Classification Search
None
See application file for complete search history.

(56) References Cited

U.S. PATENT DOCUMENTS

| | | | |
|---|---|---|---|
| 5,471,573 A * | 11/1995 | Kaasila | 345/441 |
| 5,717,905 A * | 2/1998 | Iwamoto et al. | 703/1 |
| 6,029,173 A * | 2/2000 | Meek et al. | 707/696 |
| 6,047,280 A | 4/2000 | Ashby et al. | |
| 6,161,071 A | 12/2000 | Shuman et al. | |
| 6,304,818 B1 * | 10/2001 | Kamiya | 701/520 |
| 6,405,128 B1 | 6/2002 | Bechtolsheim et al. | |
| 7,002,578 B1 * | 2/2006 | Ritter | 345/427 |
| 7,084,882 B1 * | 8/2006 | Dorum et al. | 345/589 |

(Continued)

FOREIGN PATENT DOCUMENTS

| | | |
|---|---|---|
| DE | 102007044761 | 5/2008 |
| EP | 0919788 | 6/1999 |

(Continued)

OTHER PUBLICATIONS

Hua et al. Enhanced Interval Analysis for Phase Stability: Cubic Equation of State Models Ind. Eng. Chem. Res. 1998, 37, pp. 1519-1527.*

(Continued)

*Primary Examiner* — Omar Fernandez Rivas
*Assistant Examiner* — Cuong Luu
(74) *Attorney, Agent, or Firm* — Lempia Summerfield Katz LLC (57) ABSTRACT

A method and system for using Bezier curves in vehicle positioning and electronic horizon applications for providing data to advanced driver assistance systems (ADAS) applications are disclosed. The Bezier curves are obtained from B-splines. The obtained Bezier curves are subdivided in a manner that allows the vehicle positioning application to derive a polyline representation in real time. Using the Bezier and polyline geometry, the vehicle positioning application provides a vehicle position approximation to the ADAS applications. Using the Bezier curves, the electronic horizon application provides curvature, slope, and heading profiles to the ADAS applications.

20 Claims, 9 Drawing Sheets

(56) References Cited

U.S. PATENT DOCUMENTS

| | | |
|---|---|---|
| 7,477,988 B2 | 1/2009 | Dorum |
| 7,509,214 B2 | 3/2009 | Nagel |
| 7,734,410 B2 * | 6/2010 | Tooyama et al. ............. 701/457 |
| 2001/0027375 A1 | 10/2001 | Machida et al. |
| 2005/0073520 A1 * | 4/2005 | Papakipos et al. ............ 345/420 |
| 2006/0155464 A1 * | 7/2006 | Smartt .......................... 701/208 |
| 2007/0158125 A1 | 7/2007 | Braeuchle et al. |
| 2007/0219709 A1 | 9/2007 | Ikeda |
| 2008/0252791 A1 * | 10/2008 | Mitsunaga .................... 348/673 |
| 2011/0264708 A1 * | 10/2011 | Smartt .......................... 707/803 |

FOREIGN PATENT DOCUMENTS

| | | |
|---|---|---|
| EP | 1098168 | 5/2001 |
| EP | 1593936 | 11/2005 |
| EP | 1615141 | 1/2006 |
| EP | 1857780 | 11/2007 |
| EP | 1962059 | 8/2008 |
| EP | 1912176 | 1/2009 |

OTHER PUBLICATIONS

Extended European Search Report from EP Application No. 09252190.5, dated Feb. 13, 2013.

Extended European Search Report from EP Application No. 09252209.3, dated Feb. 13, 2013.

Schroedl et al., Mining GPS Traces for Map Refinement, 2004, pp. 59-87, vol. 9, Data Mining and Knowledge Discovery.

Wang et al., Lane Detection Using B-Snake, 1999, Information Intelligence and Systems 1999 Proceedings.

European Search Report cited in EP14187558, mailed Oct. 17, 2014.

* cited by examiner

BEZIER CURVES FOR ADVANCED DRIVER ASSISTANCE SYSTEM APPLICATIONS

REFERENCE TO RELATED APPLICATIONS

This application is a divisional application under 37 C.F.R. §1.53(b) of U.S. patent application Ser. No. 12/540,665 filed Aug. 13, 2009 now U.S. Pat. No. 8,725,474, the entire disclosure of which is hereby incorporated by reference, which claims the benefit of U.S. Provisional Patent Application No. 61/101,758 filed Oct. 1, 2008 and entitled "BEZIER CURVES FOR ADVANCED DRIVER ASSISTANCE SYSTEM APPLICATIONS." The full disclosure of U.S. Provisional Patent Application Ser. No. 61/101,758 is incorporated herein by reference.

The present patent application is related to the copending patent application filed on the same date, Ser. No. 12/540,704, entitled "CREATING GEOMETRY FOR ADVANCED DRIVER ASSISTANCE SYSTEMS," which is incorporated herein by reference.

FIELD

The present invention relates generally to advanced driver assistance systems (ADAS), and more particularly, relates to using Bezier curves to provide vehicle positioning, curvature, slope, and heading information to ADAS applications.

BACKGROUND

ADAS was developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic, and vision-oriented sensors, such as digital video cameras and LIDAR.

Some advanced driver assistance systems also use digital map data. These systems are sometimes referred to as map-enhanced ADAS. The digital map data can be used in advanced driver assistance systems to provide information about the road network, road geometry, road conditions, and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills, or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The navigation system database has much more data than an advanced driver assistance system needs. Additionally, a geographic database designed for navigation may not have all the data and/or may not have data with the accuracy levels needed by the advanced driver assistance system. As a result, there has been some effort in designing a geographic database specifically for advanced driver assistance systems. For example, U.S. Patent Publication No. 2006/0100780 describes a geographic database having a data storage format designed for a sensor device in a motor vehicle system. However, there is room for improvement in a geographic database designed specifically for advanced driver assistance systems.

SUMMARY OF THE INVENTION

A method and system for using Bezier curves in vehicle positioning and electronic horizon applications for providing data to ADAS applications are disclosed. The Bezier curves are obtained from B-splines. The obtained Bezier curves are subdivided in a manner that allows the vehicle positioning application to derive a polyline representation in real time. Using the Bezier and polyline geometry, the vehicle positioning application provides a vehicle position approximation to the ADAS applications. Using the Bezier curves, the electronic horizon application provides curvature, slope, and heading profiles to the ADAS applications.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION OF THE DRAWINGS AND PRESENTLY PREFERRED EMBODIMENTS

ADAS Architecture

Figure 1:
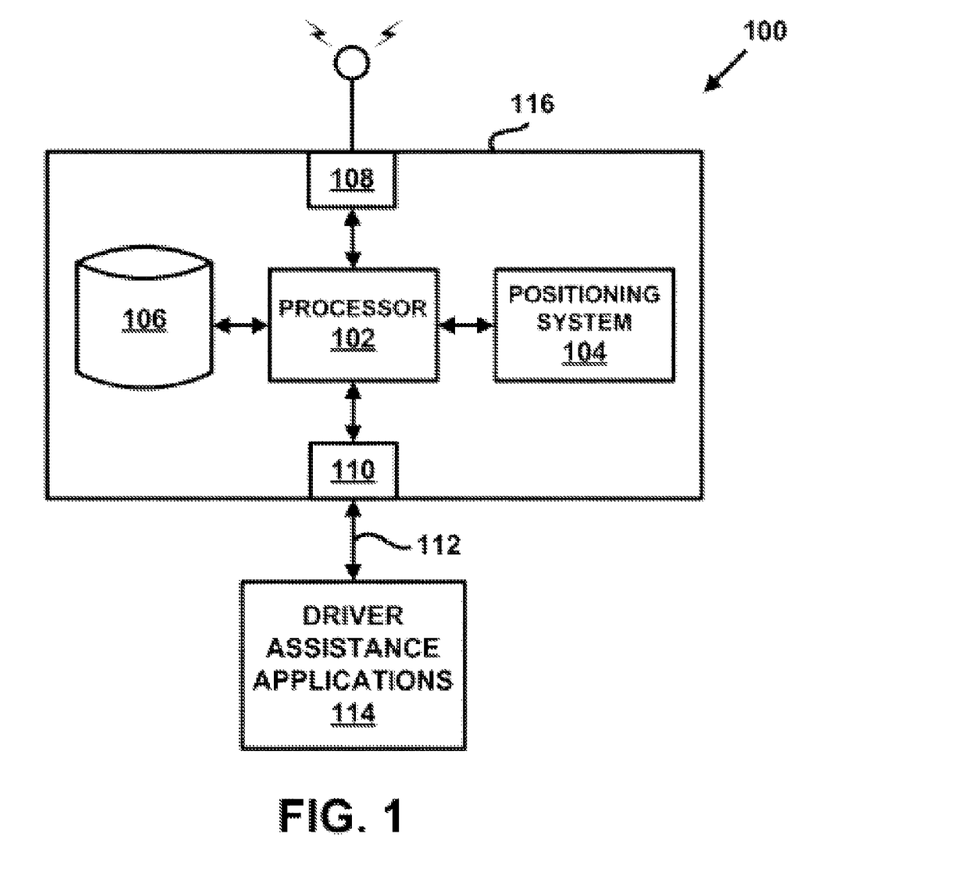
FIG. 1 is a block diagram of map-enhanced ADAS architecture, according to an example.

FIG. 1 is a block diagram of map-enhanced ADAS architecture 100. In this example, the map-enhanced ADAS architecture 100 includes driver assistance applications 114, and a map and positioning engine (MPE) 116. The MPE 116 is shown in FIG. 1 as a standalone module; however, it is understood that the MPE 116 may be distributed into multiple packages and/or integrated into other device packages, such as a sensor package. The MPE 116 includes a processor 102, a positioning system 104, a geographic database 106, a communications system 108, and an in-vehicle data bus interface 110. The MPE 116 may also include other hardware, software, and/or firmware, such as memory and a power source.

The processor 102 may be any type of processor, controller, or other computing device. For example, the processor 102 may be a digital signal processor. The processor 102 receives inputs from the positioning system 104, the geographic database 106, the communication system 108, the in-vehicle data bus interface 110, and other sources. The processor 102 then processes the inputs using application software programs 200, some of which are described with reference to FIG. 2.

The processor 102 then provides outputs to the driver assistance applications 114 via the in-vehicle data bus interface 110 and a data bus 112. Preferably, the in-vehicle data bus interface 110 and the data bus 112 are a Controller-Area Network (CAN) interface and a CAN bus, which are designed for automotive applications. The driver assistance applications 114 may include adaptive headlight aiming, adaptive cruise control, obstruction detection, obstruction avoidance, collision avoidance, adaptive shift control, and others.

The positioning system 104 may utilize GPS-type technology, a dead reckoning-type system, or combinations of these or other systems, which are known in the art. The positioning system 104 may also include suitable sensing devices that measure the traveling distance speed, direction, orientation, and so on. For example, the positioning system 104 may include a GPS system and a gyroscope. The positioning system 104 provides an output signal to the processor 102. Some of the application software programs 200 that run on the processor 102 use the output signal from the positioning system 104 to determine the location, direction, orientation, etc., of the MPE 116.

The geographic database 106 is designed for ADAS applications. Like a navigation system geographic database, the geographic database 106 contains data about roads and intersections in a geographic region. For example, the geographic database 106 contains at least one database record (also referred to as "entity" or "entry") for each road segment (also referred to as a link). When the road segment is represented as a B-spline or Bezier curve(s), the road segment data record includes data providing the geographic coordinates (e.g., the latitude, longitude, and altitude) of control points. The end points (also referred to as nodes) of the road segment correspond to the first and last control points. Additionally, the road segment data record may also contain a knot vector for B-spline geometry.

When the road segment is represented as shape point geometry, the road segment data record includes data providing the geographic coordinates (e.g., the latitude, longitude, and altitude) of the end points of the represented road segment. For curved segments, the road segment data record also includes data providing the geographic coordinates (e.g., the latitude, longitude, and altitude) of the shape points used to characterize the polyline.

The road segment data record is further described with reference to FIG. 3.

The geographic database 106 may include higher quality (i.e., more accurate) data than the data typically contained in a navigation system geographic database. For example, with respect to road geometry, the data in the geographic database 106 may be more accurate with respect to longitude, latitude, and/or altitude. Also, the starting and stopping locations of tunnels may be more accurately specified in the geographic database 106. Further, the data in the geographic database 106 may be more accurate with respect to derived information, such as curvature.

The geographic database 106 may also include more kinds of data (e.g., more kinds of attributes) than the data typically contained in a navigation system geographic database. For example, the geographic database 106 may include data about road objects, such as signs and crosswalks, including their positions along a road segment, sign object type, and sign text. Some of the data attributes found in the geographic database 106 are described with reference to FIG. 4.

Figure 2:
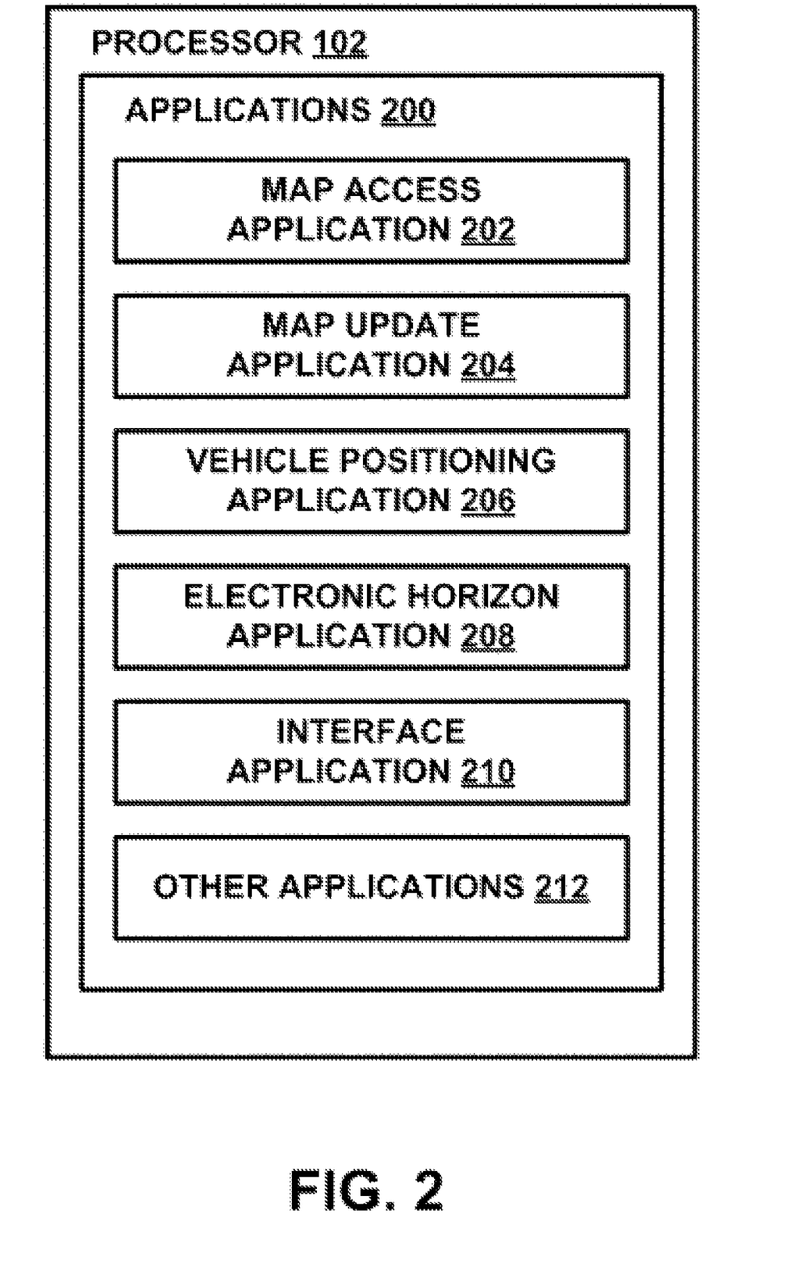
FIG. 2 is a block diagram of software applications available to a processor depicted in FIG. 1, according to an example.

FIG. 2 is a block diagram depicting some of the software applications 200 available to the processor 102. The software applications 200 depicted in FIG. 2, include a map access application 202, a map update application 204, a vehicle positioning application 206, an electronic horizon application 208, and an interface application 210. As this is not an exhaustive list of all the software applications 200 available to the processor 102, FIG. 2 also depicts other applications 212, which may include a startup routine, self-test diagnostics, and so on.

The map access application 202 provides data access to the geographic database 106 stored on physical storage media. The map access application 202 receives a request for data from the processor 102 and locates data responsive to the request on the physical storage media. The map access application 202 preferably provides an application programming interface (API) for use by the processor 102 and/or the applications 200.

The map update application 204 facilitates updates to the geographic database 106. The communications system 108 receives one or more parcels that either add additional coverage to an existing database or replace existing parcels. A parcel is a unit of storage for storing geographic data in the geographic database 106 on physical storage media. For new parcels, the map update application 204 stores the parcel on the physical storage media. For existing parcels, the map update application 204 replaces the old parcel with the new parcel on the physical storage media.

The vehicle positioning application 206 determines the vehicle's position relative to a road network that is represented by data included in the geographic database 106. The vehicle positioning application 206 uses the output from the positioning system 104 and matches the output to data in the geographic database 106 using a vehicle positioning algorithm, which is sometimes referred to as a map matching algorithm.

The electronic horizon application 208 determines an electronic horizon. An electronic horizon is a collection of roads and intersections leading out from the current vehicle position to an extent determined by the electronic horizon application 208. The collection of roads and intersections are potential paths that the vehicle may follow from the current vehicle position. The electronic horizon application 208 determines extent using one or more costing functions. The costing functions are based on the needs of the driver assistance applications 114 and may take into consideration various factors, such as vehicle speed, travel time, and driving distance. An example electronic horizon application is described in U.S. Pat. No. 6,405,128, which is assigned to the same assignee as the current application and is hereby incorporated by reference in its entirety.

The interface application 210 controls communications between the MPE 116 and the driver assistance applications 114 via the interface 110 and the bus 112. Preferably, the interface application 210 is based on the CAN protocol, which is a serial communication protocol for communicating between various electronic devices in the vehicle. In accordance with the CAN protocol, the various electronic devices in the vehicle can be coupled to a single serial bus (e.g., the bus 112) such that messages and data can be sent from one electronic device in the vehicle to another. The CAN protocol is a message based protocol in which CAN frames are placed on a common CAN bus. The CAN bus may be a single wire or a differentially driven pair of wires.

Figure 3:
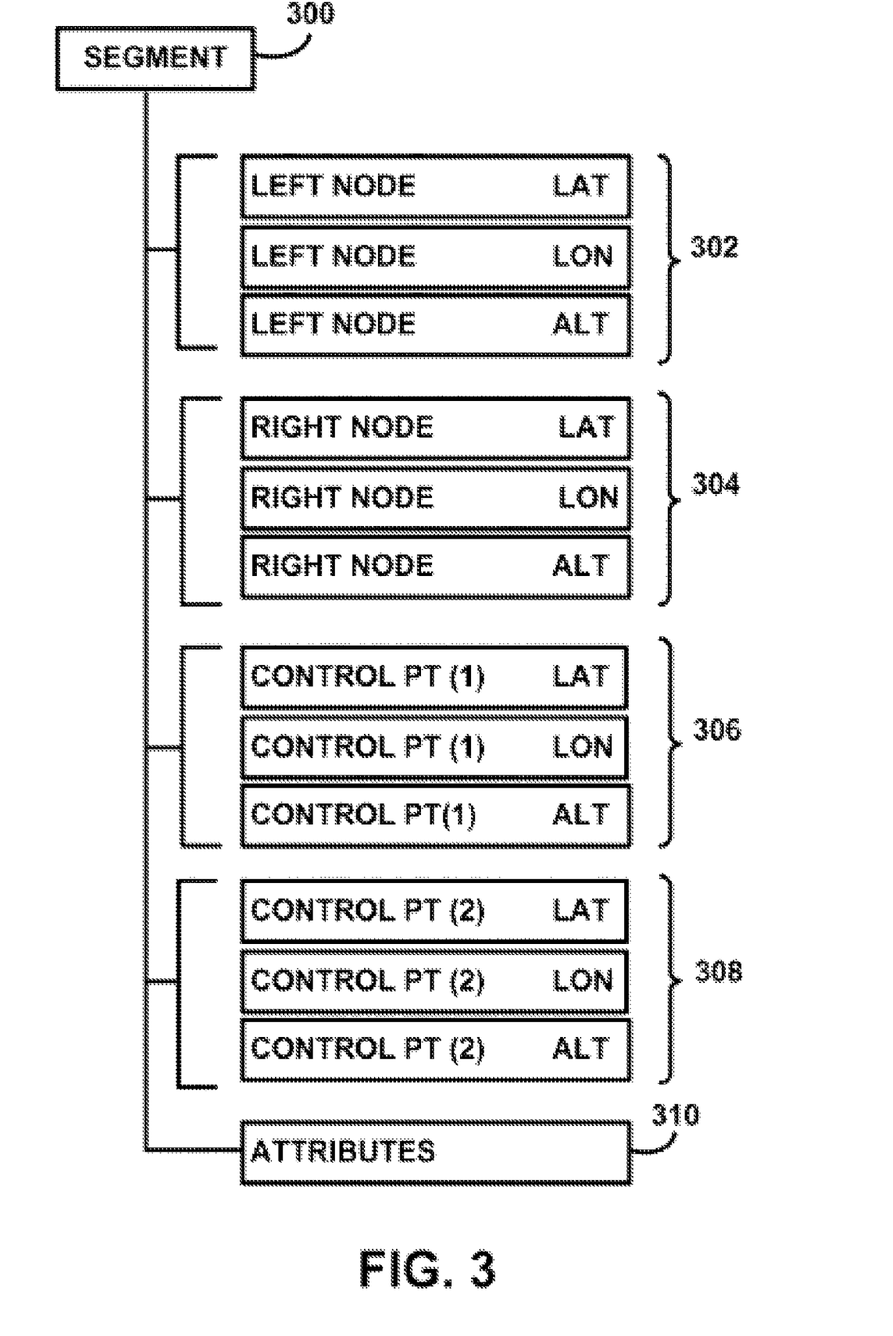
FIG. 3 is a block diagram of a road segment data record from the geographic database depicted in FIG. 1, according to an example.

FIG. 3 is a block diagram of a road segment data record 300 from the geographic database 106. The road segment data record 300 includes data used to represent a portion of the road. The data include node data 302, 304, which identify the latitude, longitude, and altitude coordinate positions of the end points of the segment.

The data also include control point data 306, 308, which identify the latitude, longitude, and altitude coordinate positions of control points that can be used to represent the shape of a straight or curved segment. While the data for two control points are shown in FIG. 3, it is understood that a segment can contain more than one curve and the number of control points may depend on the number and shape of the curves in the segment. For example, each cubic Bezier curve is represented by four control points, but the last control point of a previous Bezier curve is the same as the first control point of the next Bezier curve. The road segment data record 300 stores data for the number of control points equal to the number of Bezier curves multiplied by three, plus one.

Figure 4:
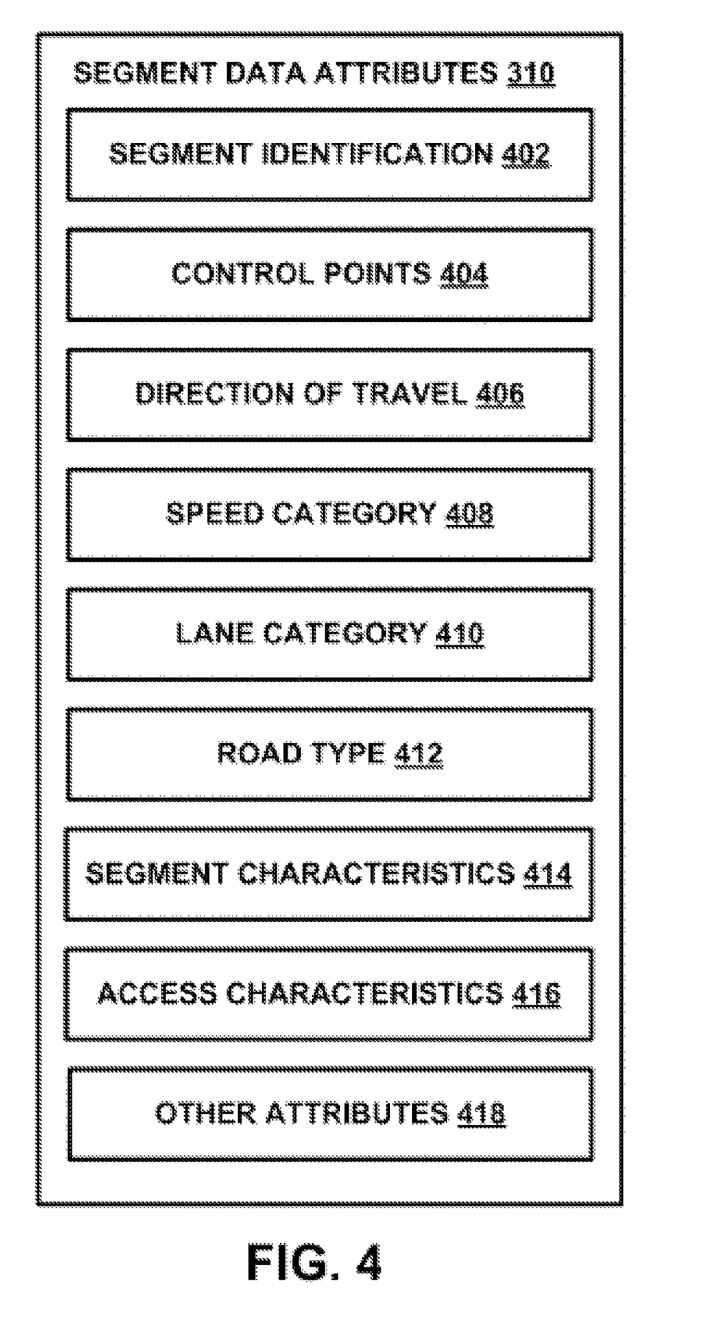
FIG. 4 is a block diagram of data attributes for the road segment data record depicted in FIG. 3, according to an example.

The data further include attributes 310 for the segment. Some of the attributes 310 of the segment are depicted in FIG. 4. The road segment data record 300 may include additional data, such as shape point data, as well.

FIG. 4 is a block diagram of some of the data attributes 310 for a road segment data record 300. The data attributes 310 depicted in FIG. 4 include segment identification (ID) 402, control points 404, direction of travel 406, speed category 408, lane category 410, road type 412, segment characteristics 414, and access characteristics 416. As this is not an exhaustive list of all the data attributes for the road segment data records, FIG. 4 also depicts other attributes 418. For example, the segment data attributes 400 may also include references to node data records in the form of a node ID corresponding to end points 302, 304 of the segment.

The segment ID 402 identifies a data record in the geographic database 106.

The control point attributes 404 contain bit flags that provide additional information regarding control points to aid in the creation of curvature and slope profiles as described with reference to FIG. 9. For example, the control point attributes 404 may include a byte-size flag per control point. One of the bits in the flag is assigned to curvature, while another of the bits is assigned to slope. If the curvature bit flag is set to one, then the control point is marked as part of the curvature profile. Similarly, if the slope bit flag is set to one, then the control point is marked as part of the slope profile.

The direction of travel attribute 406 represents the allowed direction of traffic flow on a segment. For example, the segment may represent a portion of a road network in which travel is permitted in both directions. Alternatively, the segment may represent a portion of a road network allowing only one-way travel. The direction of travel attribute 406 identifies whether the segment allows bi-directional travel or unidirectional travel, and if unidirectional, the direction of travel attribute 406 also identifies the allowed direction of travel.

The speed category attribute 408 represents the general speed trend of a road based on posted or implied speed limit. The speed category attribute 408 contains data associated with a speed range. For example, the speed category attribute 408 may include a data representation of the integer 1 for speeds exceeding 80 mph, the integer 2 for speeds in the range of 65-80 mph, the integer 3 for speeds in the range of 55-64 mph, and so on until the speed range includes 0 mph.

The lane category attribute 410 represents the predominant number of lanes on a segment in one direction of travel. Preferably, the lane category attribute 410 does not include turn lanes. If the number of lanes is different for each direction, the lane category attribute 410 may represent the higher number.

The road type attribute 412 represents the type of road and/or functional class that the segment represents. For example, the road type attribute 412 may contain data associated with an interstate highway, a controlled access highway, a pedestrian walkway, and so on.

The segment characteristic attribute 414 contains bit flags that describe various characteristics of the segment. For example, the segment characteristic attribute 414 may identify whether a segment is paved, a ramp, a bridge, a tunnel, a roundabout, and so on.

The access characteristic attribute 416 contains bit flags that define the types of traffic allowed on the segment. For example, the access characteristic attribute 416 may identify whether cars, buses, trucks, taxis, emergency vehicles, pedestrians, and so on are allowed on the segment.

Creating Geometry for the MPE

Figure 5:
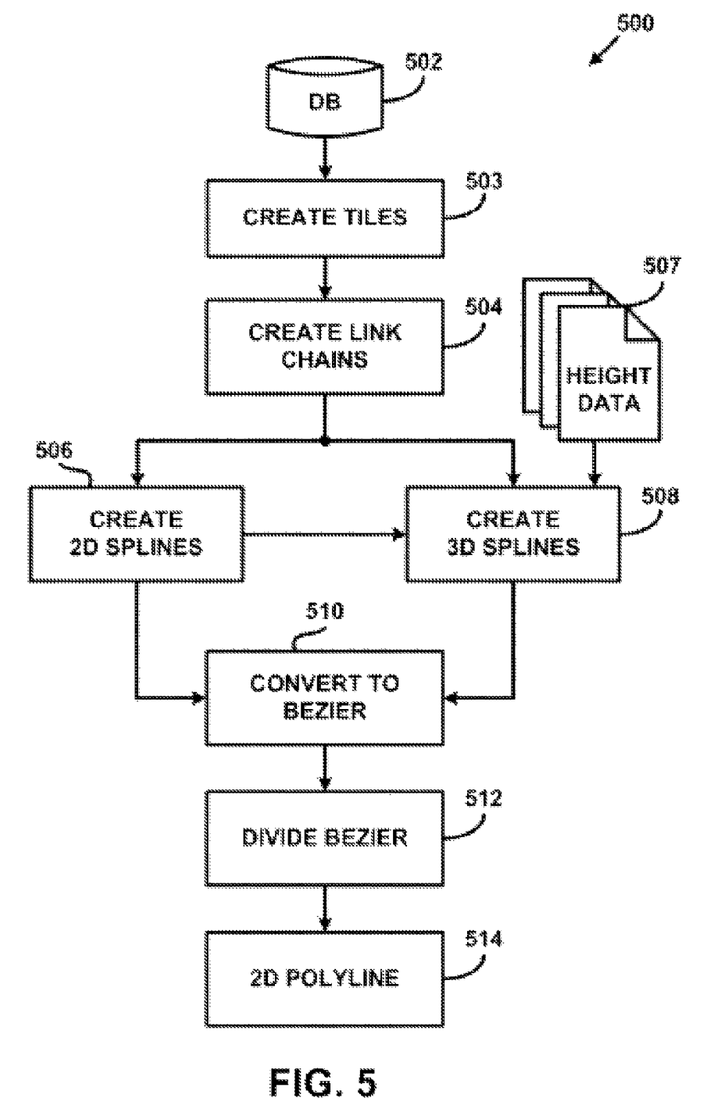
FIG. 5 is a flow chart for creating geometry for ADAS, according to an example.

FIG. 5 is a flow chart of a method 500 for creating geometry for the MPE 116. At block 503, the method 500 subdivides a geographic database 502 into tiles to enable parallel processing. The geographic database 502 may be the geographic database 106 or a different database that includes the data in the geographic database 106.

The tiles are formed in such a way that each tile contains approximately equal amount of nodes and shape points. The map surface is covered by an imaginary 2D rectangular grid with fine (approximately 2 km by 2 km) cells. Then, the density of the nodes and shape points is computed by mapping the nodes and shape points in the geographic database 502 onto the grid. The tiles are assembled from the grid cells.

In order to ensure that each tile has approximately equal number of nodes and shape points, the whole grid is recursively subdivided in half along the grid lines, both in horizontal and vertical directions, in such a way that each of the two partitions contain an equal number of geometrical points. The process continues until the tiles contain an amount of nodes and shape points that is smaller than a predefined threshold. The direction of each subdivision is selected in such a way that the aspect ratio of the tiles is minimized.

II At block 504, the method 500 creates link chains within each tile using data from the geographic database 502. The link chains are a sequence of segments, with each of the segments having the same road type attribute 412. The link chains are created using a software routine. The software routine selects a first segment having an associated functional class. At each node, the software routine selects the next segment to add to the link chain. The sequence of segments is preferably made as long as possible. The link chains are used to perform a B-spline fit to ensure smoothness across segment boundaries.

At block 506, the method 500 creates 2D B-splines using the link chains created at block 504. At block 508, the method 500 creates 3D B-splines using the link chains created at block 504, the 2D B-splines created at block 506, and height data 507. A spline refers to any composite curve formed with piecewise polynomial functions representing curve sections and satisfying specified conditions at boundaries of the sections. Thus, there are many types of spline curves including B-splines. A B-spline has control points and knots. Knots are the points at which individual polynomial curve segments of a polynomial spline curve join together. The segments are joined in such a way as to provide smoothness of the complete curve. A knot vector is an ordered list of non-decreasing floating point numbers that describe points along the spline curve where segments begin and end. Splines are well-known in the art.

With splines, map features, including curving road portions, are represented by polynomial equations whose coefficients have been determined so as to generate curves that match the shapes of the geographic features with the desired degree of accuracy. Thus, splines are a means of describing the shape of the underlying road geometry by specifying the coefficients of a polynomial equation. As described in U.S. Pat. No. 7,084,882, splines have been used to represent shapes of road segments in navigation system databases. U.S. Pat. No. 7,084,882 is assigned to the same assignee as the current application and is hereby incorporated by reference.

The link chains are fitted to create 2D B-splines. The 2D B-splines are manipulated to correct irregularities and alignment problems. Knots not needed to encode curvature or preserve the position, curvature, slope, and/or heading are removed to minimize storage requirements.

The optimized 2D B-splines and the height data 507 are used to create 3D splines. The height data 507 is preferably obtained from GPS/IMU traces collected as vehicles travel on the roads represented by the road segments; however, the height data 507 may be obtained from other sources and/or sensors. The height data 507 is linearly corrected at crossing nodes to account for GPS height inaccuracies. The link chains are fitted to create an altitude B-spline using the corrected height data.

The 2D B-spline and the altitude B-spline are merged to obtain a 3D B-spline. Like the 2D B-spline, knots not needed to encode curvature and slope, or preserve the position, curvature, slope, and/or heading are removed from the 3D B-spline to minimize storage requirements.

At block 510, the 2D B-splines and the 3D B-splines may be converted to Bezier curves. If a segment does not have height data, the 2D B-spline is converted to a Bezier curve. However, if the segment does have height data, the 2D B-spline may only be used to create the 3D B-spline at block 508.

Cubic Bezier curves are defined by two end points and two additional control points that are positioned along tangents to the curve at the end points. The cubic Bezier curve equation can be written in vector form as follows:

$$\vec{B}(t) = (1-t)^3 P_0 + 3t(1-t)^2 P_1 + 3t^2(1-t) P_2 + t^3 P_3$$

where $P_0$, $P_1$, $P_2$, and P3 are the control points and t is the parameter. Bezier curves can be derived from B-spline curves using known methods.

While spline geometry is useful for representing road segment geometry, the use of B-splines in the MPE 116 increases the computational requirements for the vehicle positioning and the electronic horizon applications 206, 208. The analytical B-spline geometry is converted into a Bezier representation to facilitate real time derivation of a polyline representation by the vehicle positioning application 206 and an electronic horizon by the electronic horizon application 208.

Figure 6:
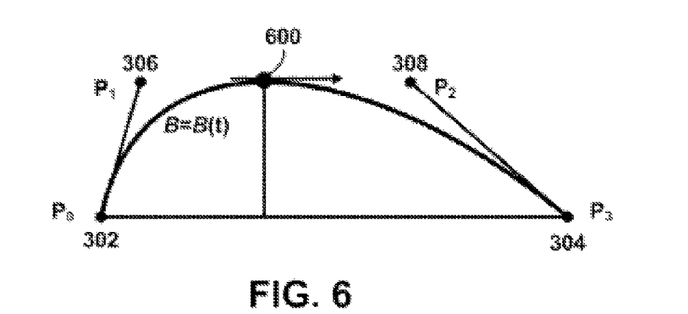
FIG. 6 is a diagram of an example Bezier curve.

At block 512, the Bezier road geometry is divided so that the vehicle positioning application 206 can derive a polyline representation in real time. The method 500 assumes that the road geometry has Bezier curves such that when a point farthest from its chord is projected onto the chord line, the point falls inside the chord. The Bezier road geometry is divided after identifying a point 600 (or possibly more than one point) at a furthest distance (or distances) from the Bezier curve to a line connecting the end points 302, 304 of the curve (i.e., the control polygon base chord, $\overrightarrow{P_0 P_3}$) as shown in FIG. 6. Also seen in FIG. 6, the furthest distance is generally not in the center of the curve.

The optimal subdivision point 600 is the point on the Bezier curve that is the furthest from the control polygon base chord. The position of the point 600 is obtained analytically from the condition that the tangent to the 2D Bezier curve B(t) at the point 600 is parallel to the chord.

$$\frac{d\vec{B}}{dt} = \alpha \overrightarrow{P_0 P_3}.$$

The expression above is reduced to a quadratic equation for the parameter t. For a general Bezier curve, the quadratic equation may not have real roots in the interval [0-1] on which the parameter t is defined. However, for well-behaved Bezier curves, the quadratic equation will have one or two real roots in the [0-1] interval. If the quadratic equation has two real roots, two subdivision points are used to split the Bezier curve at two points. Once the point 600 is obtained, the Bezier curve is split into two Bezier curves using the de Casteljau subdivision algorithm. The resulting Bezier curves are stored in the geographic database 106.

Figure 7:
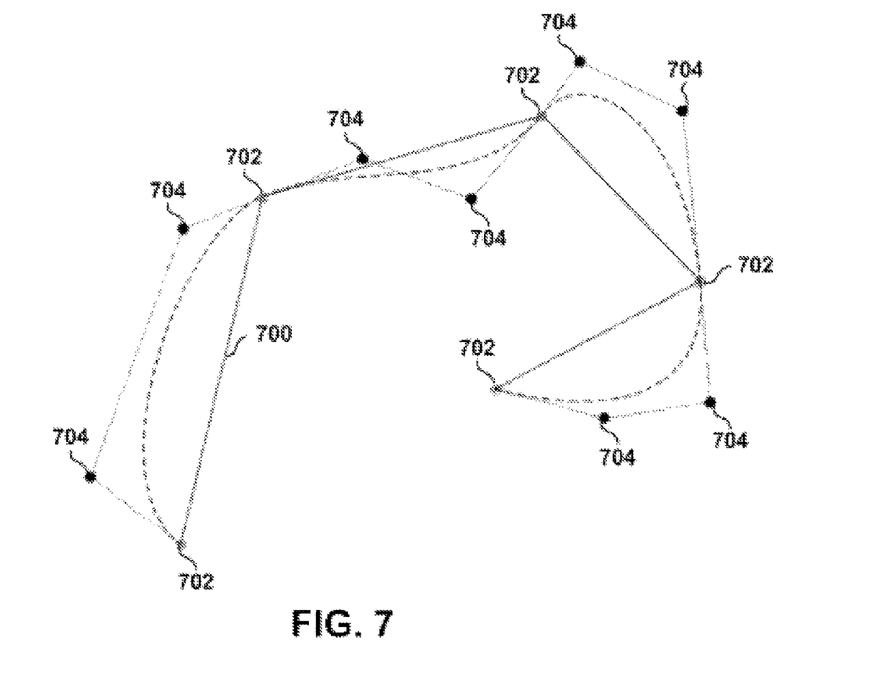
FIG. 7 is a diagram of an example polyline generated from Bezier curves.

At block 514, the vehicle positioning application 206 derives a polyline representation in real time. An example polyline representation 700 is depicted in FIG. 7. The vehicle positioning application 206 derives the polyline representation 700 by connecting the end points 702 of the Bezier curves while ignoring the internal control points 704.

Using Bezier Road Geometry to Determine Vehicle Position

Figure 8:
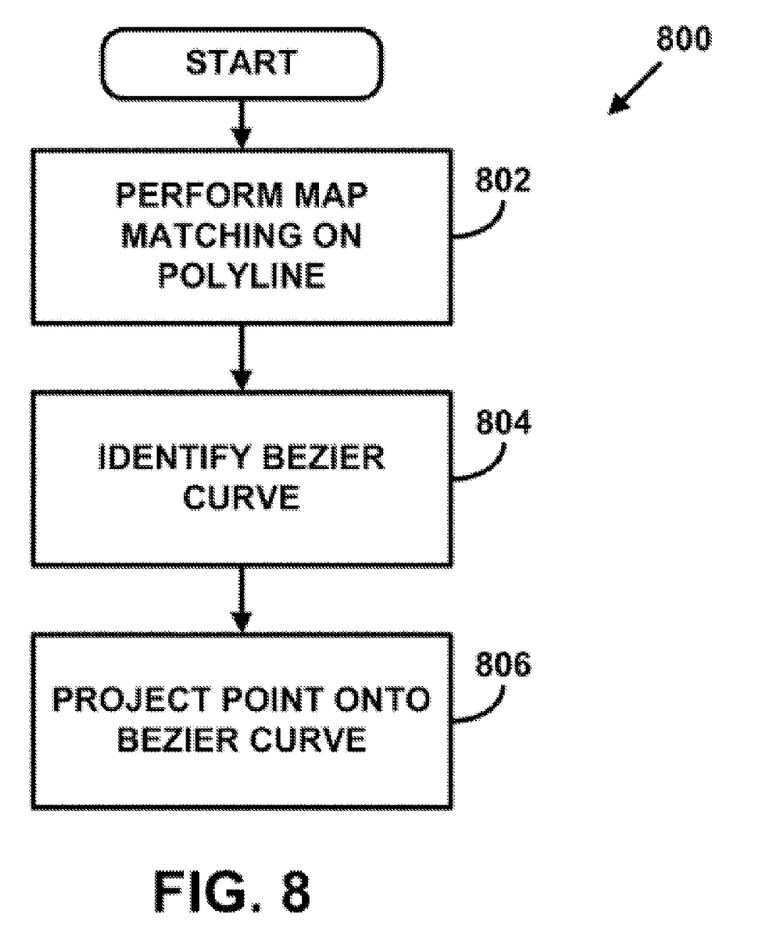
FIG. 8 is a flow chart for vehicle positioning using a dual road geometry representation, according to an example.

FIG. 8 is a flow chart for a method 800 of vehicle positioning using dual road geometry representation. The dual road geometry representation includes the Bezier geometry obtained at block 512 and the polyline geometry obtained at block 514. The vehicle positioning application 206 performs the method 800 during operation of the MPE 116. In particular, the vehicle positioning application 206 performs the method 800 after determining the polyline geometry at block 514.

At block 802, the vehicle positioning application 206 performs map matching analysis to determine the closest point to the vehicle on the polyline representation as determined at block 514. The map matching analysis may be conducted using conventional vehicle positioning algorithms.

At block 804, the vehicle positioning application 206 identifies the appropriate Bezier curve from the point on the polyline found at block 802. The vehicle positioning application 206 computes a lookup table on the fly to associate the Bezier curves with the computed polyline. The length along the polyline is used in the lookup table to identify the corresponding Bezier curve.

At block 806, the vehicle positioning application 206 projects the map matched point identified at block 802 onto the Bezier curve identified at block 804. The vehicle positioning application 206 obtains an approximation of vehicle position on the Bezier curve by solving a cubic equation numerically using a combination of Newton's and bisection methods.

Because the vehicle positioning application 206 is approximating vehicle position on the Bezier curve, the process is simplified from processes that attempt to identify exact vehicle position. This simplification is useful for the MPE 116 as the MPE 116 is likely to have less computing capabilities than a navigation system, for example. The vehicle positioning application 206 provides the vehicle position approximation to one or more of the driver assistance applications 114 via the interface application 210, the in-vehicle data bus interface 110, and the data bus 112.

Using Bezier Road Geometry to Derive Curvature and Slope Profile

Figure 9:
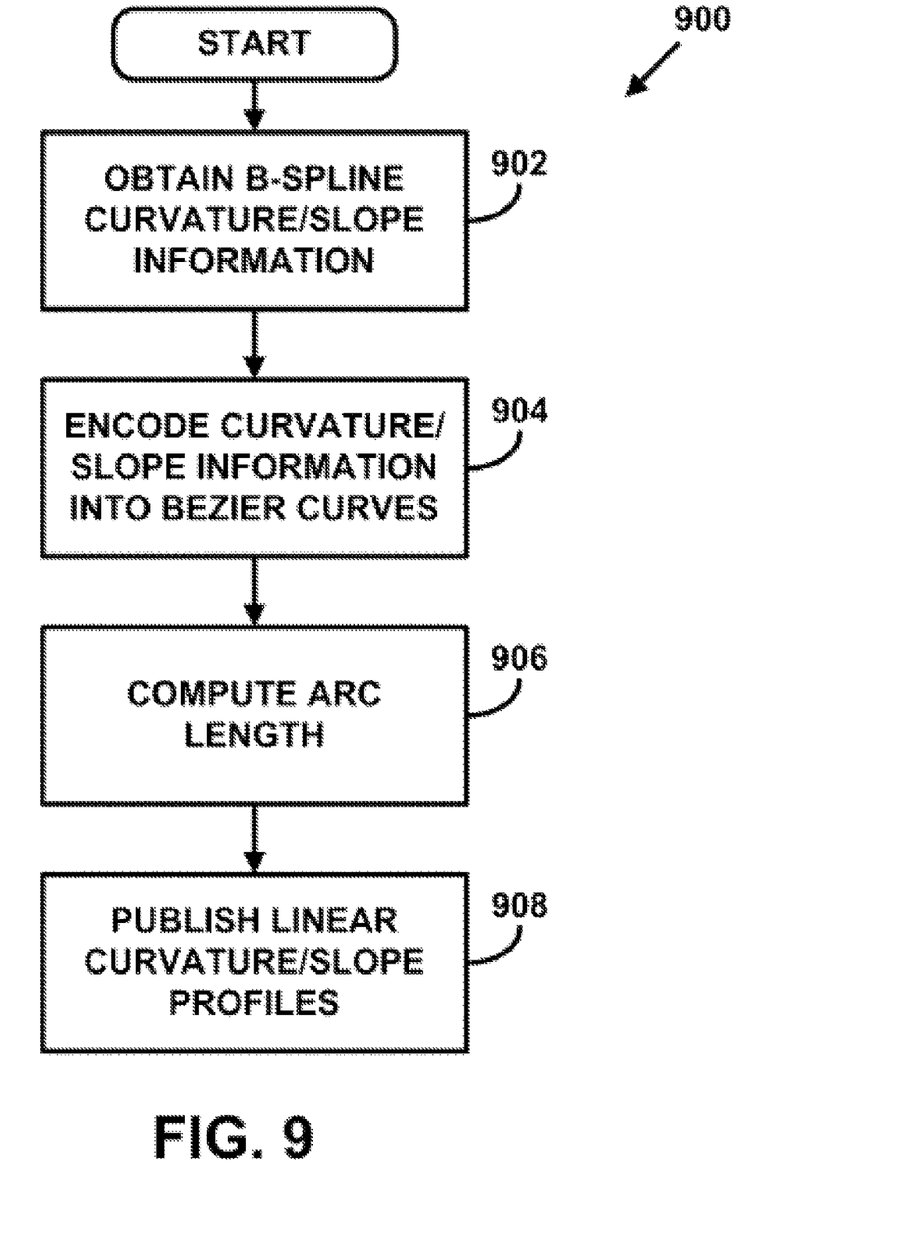
FIG. 9 is a flow chart for generating curvature and slope profiles, according to an example.

FIG. 9 is a flow chart of a method 900 for generating curvature and slope profiles. The resulting curvature and slope profiles for a segment may have a piecewise linear format. Blocks 902-904 depict pre-processing steps that occur prior to loading the geographic database 106. As a result of these steps, data is stored in the geographic database 106 for use by the electronic horizon application 208. Blocks 906-908 depict processing that occurs when the MPE 116 is operational.

At block 902, the method 900 obtains curvature and slope information from the B-splines. The curvature information may be obtained by taking samples along the B-spline and computing 2D (i.e., horizontal) curvature and arc length at each sample point. The measured curvature and arc length are graphed (e.g., curvature along the y-axis, arc length along the x-axis). The method 900 applies the Douglas-Peucker line simplification technique using recursive subdivision to the plot until the polyline approximation is within a desired tolerance. These polylines have coordinates of arc length and curvature (i.e., (l, k)). The slope information may be obtained in a similar way.

At block 904, the method 900 encodes the vertices of the piecewise-linear approximation into the Bezier control points. The method 900 identifies points on the B-spline that correspond to the vertexes of the polyline. The method 900 inserts knots into the B-spline at the identified points. The inserted knots are tagged/flagged as curvature II knots or slope knots. After inserting the additional knots, the method 900 removes as many original untagged knots from the B-spline not needed to keep the B-spline within a threshold tolerance from the 2D/3D position, shape, heading, slope, and curvature of the original B-spline. The resulting B-splines are then converted to Bezier curves. Additionally, the B-spline knot flags that mark the curvature and slope knots are converted to the Bezier curve control point flags 404.

At block 906, the electronic horizon program 208 computes arc length for the Bezier curves in the electronic horizon. Preferably, the electronic horizon program 208 uses Gaussian quadrature to estimate arc length. Evaluating Bezier curve derivatives at four internal points to calculate the arc length is a sufficiently good approximation.

At block 908, the electronic horizon program 208 publishes a curvature profile (curvature vs. arc length) using the curvature obtained at block 902 and encoded at block 904, and the arc length calculated at block 906. Similarly, the electronic horizon program 208 publishes a slope profile (slope vs. arc length) using the slope obtained at block 902 and encoded at block 904, and the arc length calculated at block 906.

The electronic horizon application 208 provides the curvature and/or slope profiles to one or more of the driver assistance applications 114 via the interface application 210, the in-vehicle data bus interface 110, and the data bus 112. Preferably, the electronic horizon application 208 provides the profiles as a pair of values (i.e., arc length and curvature, or arc length and slope) or two pairs of values if the profile is not continuous for a driven length. The number of pairs provided should be sufficient for the needs of the driver assistance applications 114, but not too much as to degrade communications on the data bus 112.

Using Bezier Road Geometry to Derive Heading Profile

Figure 10:
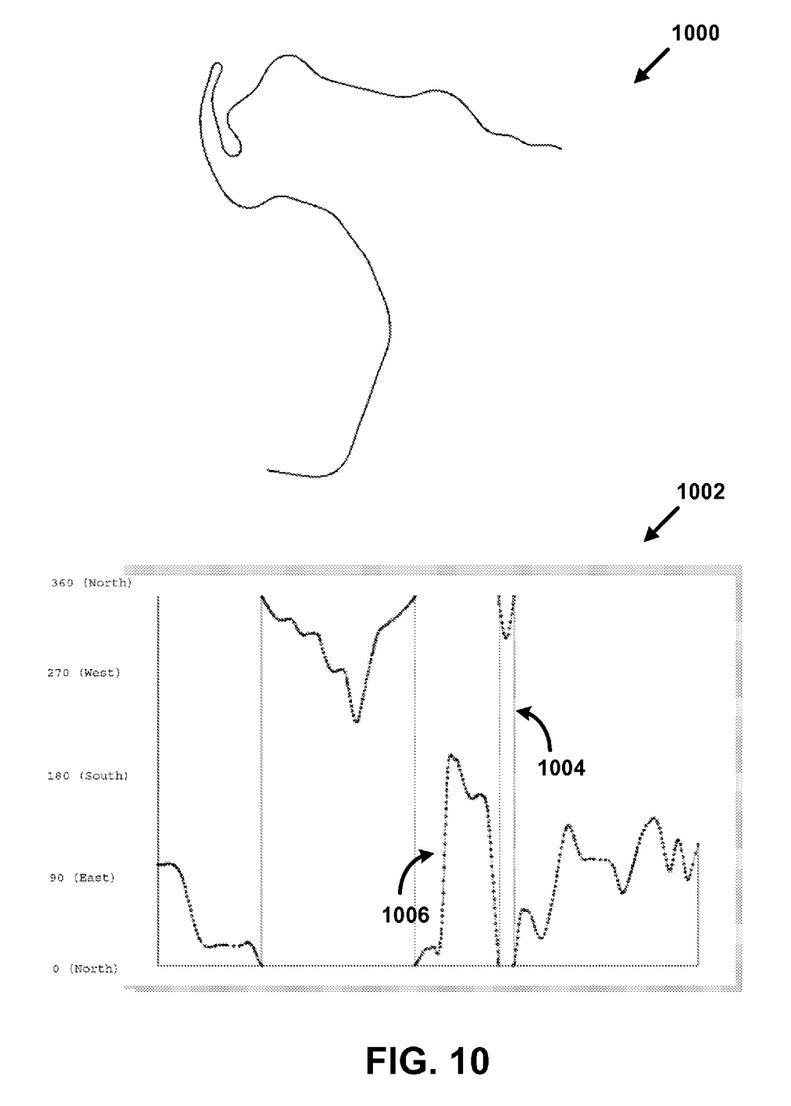
FIG. 10 is depicts a B-spline that corresponds to segments of a road and associated heading profile, according to an example.

FIG. 10 depicts a B-spline 1000 that corresponds to the segments of a road and an associated heading profile plot 1002. The lines 1004 in the plot 1002 represent an actual heading and the points 1006 in the plot 1002 are points of a piecewise-parabolic approximation described below.

A heading is the direction in which the vehicle is facing, which changes frequently as a vehicle travels on the road. The heading profile plot 1002 depicts how the vehicle's heading changes as the vehicle travels on the road relative to a compass reading. The compass reading in this example is based on north being at 0° (and 360°), east at 90°, south at 180°, and west at 270°.

Generally, the electronic horizon application 208 publishes the piecewise-parabolic heading profile plot 1002 in real time as a set of three points for each Bezier curve. The three points include the heading angles at the two end points 302, 304 and an intermediate heading angle point 1006 that the electronic horizon application 208 calculates.

To calculate the intermediate heading angle point 1006, the electronic horizon application 208 preferably samples heading angle points (e.g., four heading angle points) on the Bezier curve and performs a least squares analysis to fit a parabolic curve to the sampled heading angle points. The intermediate heading angle point 1006 is computed at midpoint $l_1=l_0+0.5*(l_2-l_0)$ from the resulting best fitting parabolic curve derived by the least squares fit to the four sampled heading angle points on the Bezier curve. Using the three points, the electronic horizon application 208 computes the heading profile as a function of driven length. The electronic horizon program 208 provides the heading profile to one or more of the driver assistance applications 114 via the interface application 210, the in-vehicle data bus interface 110, and the data bus 112.

More specifically, the heading angle h is published as a function of the driving distance l along the segment. As heading is a smooth varying function along the road, heading is best represented by a piecewise parabolic profile instead of a piecewise linear approximation. The heading angle is computed in degrees and is measured in the clockwise direction from north. The heading angle values are published in the range of 0° to 360°. Since the heading angle is a periodic function, additional points are inserted into the heading profile when the link points exactly north to avoid a 0° to 360° transition inside a parabolic segment.

The parabolas are defined by three points. Each parabolic segment interpolates the values of the heading at the ends of a Bezier curve. The least squares fit technique is employed to derive a parabola that best approximates the internal points of the h profile as described above. The point on this parabola evaluated at the parameter value t=0.5 constitutes the third heading profile point to be published for the Bezier curve. The details of the least squares fit determination of a parabolic segment h=h(l) are presented as follows.

Let $h_0=h(l_0)$ be the heading angle value at the left end of the Bezier curve, t=0, and $h_2=h(l_2)$ be the heading angle value at the right end of the Bezier curve, t=1. The equation of the parabola that approximates heading angle vs. the driving distance can be written as follows:

$$h(l)=a(l-l_0)+b(l-l_0)(l-l_2)+c,$$

where a, b, and c are unknown scalar coefficients. Coefficients a and c can be eliminated using the boundary conditions to yield:

$$h(l) = h_0 + \frac{\Delta h}{\Delta l}(l - l_0) + b(l - l_0)(l - 2),$$

where $\Delta h = h_2 - h_0$, $\Delta l = l_2 - l_0$.

The remaining scalar coefficient b is derived by minimizing the sum of the square distances between the values sampled on the actual heading profile and the approximating parabola described above, $$\sum_i (h(l_i) - \hat{h}(l_i))^2 \to \min,$$

where h are sampled heading values. Differentiating the expression above with respect to b and equating the derivative to zero yields the following expression for the remaining coefficient b:

$$b = \frac{\sum_i \left(\left(\hat{h}(l_i) - h_0 - \frac{\Delta h}{\Delta l}(l_i - l_0)\right)(l_i - l_0)(l_i - l_2)\right)}{\sum_i ((l_i - l_0)^2 (l_i - l_2)^2)}.$$

Here $l_i$ are the values of the driving distance along the spline at which heading values h are sampled.

Introducing the substitution $\lambda = l - l_0$, where $\lambda_i$ is the distance from the start of the Bezier curve, yields a simpler expression for the coefficient b:

$$b = \frac{\sum_i \left(\left(\hat{h}(\lambda_i) - h_0 - \frac{\Delta h}{\Delta l}\lambda_i\right)\lambda_i(\lambda_i - \Delta l)\right)}{\sum_i (\lambda_i^2 (\lambda_i - \Delta l)^2)}.$$

After the remaining coefficient b is evaluated from the expression above, the remaining third point for the parabolic approximation is evaluated at $$\lambda = \frac{\Delta l}{2}$$

as follows:

$$h_1\left(l_0 + \frac{\Delta l}{2}\right) = h_1(l_1) = h_0 + \frac{\Delta h}{2} - \frac{1}{4}b\Delta l^2.$$

The heading angle can be evaluated from the x and y components of the tangent vector $V_x, V_y$ as follows:

$$h = \frac{\pi}{2} - a\tan2(V_y, V_x) = a\tan2(V_x, V_y),$$

where a tan 2( ) is a standard C library function. The tangent vector components $V_x, V_y$, or the first derivative of the Bezier curve, can be evaluated in a number of ways. For example, the first derivative at the ends of the Bezier curve may be evaluated as follows:

$$\overline{V}(t=0)=3(P_1-P_0), \overline{V}(t=1)=3(P_3-P_2)$$

where $P_0$, $P_1$, $P_2$, and $P_3$ are the four control points of the Bezier curve. As another example, the first derivative in the internal points may be evaluated using the equation in the power basis form, with coefficients cached for frequent use for other purposes. The electronic horizon application 208 provides the three points $(l_{-0},h_{-0}), (l_{-1},h_{-1}), (l_{-2},h_{-2})$ that define a parabolic segment of the global heading profile to one or more of the driver assistance applications 114.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer implemented method for generating an approximation of vehicle position for use by a driver assistance application, comprising:
    performing, by a processor, a map matching analysis to determine a closest point to a vehicle position on a polyline representation of a road derived from one or more Bezier curves stored in a geographic database;
    identifying, by the processor, a Bezier curve in the geographic database corresponding to the closest point to the vehicle position on the polyline;
    projecting, by the processor, the closest point to the vehicle position on the polyline onto the identified Bezier curve to obtain an approximation of the vehicle position; and
    providing, by the processor, the approximation of the vehicle position to at least one driver assistance application.

2. The computer implemented method of claim 1, further comprising:
    obtaining, by the processor, B-spline road geometry associated with road segments representing a road network in a geographic area surrounding the vehicle position;
    converting, by the processor, the B-spline road geometry to Bezier curves;
    dividing, by the processor, the Bezier curves at a point located on the Bezier curve at a furthest distance from a control polygon base chord; and
    storing, by the processor, the divided Bezier curves in the geographic database.

3. The computer implemented method of claim 2 wherein the stored divided Bezier curves each comprise end points and internal control points, the method further comprising deriving, by the processor, the polyline representation by connecting the end points of the Bezier curves while ignoring the internal control points.

4. The computer implemented method of claim 3 wherein the deriving is performed in real time.

5. The computer implemented method of claim 3 wherein the performing, identifying, projecting and providing are performed subsequent to the obtaining, converting, dividing and storing.

6. The computer implemented method of claim 1 wherein the performing, identifying, projecting and providing are performed by a vehicle positioning application of a map and positioning engine.

7. The computer implemented method of claim 1 wherein the identifying further comprises computing, by the processor, a lookup table on the fly to associate the Bezier curve with the polyline representation.

8. The computer implemented method of claim 7 wherein the identifying further comprises using a length along the polyline representation in the lookup table to identify the corresponding Bezier curve.

9. The computer implemented method of claim 1 wherein the projecting further comprises solving, by the processor, a cubic equation numerically using a combination of Newton's and bisection methods.

10. The computer implemented method of claim 1 further comprising providing, by the processor, the vehicle position approximation to one or more of driver assistance applications via an interface therewith.

11. A system for generating an approximation of vehicle position for use by a driver assistance application, the system comprising:
    a positioning system operative to determine the location, direction and/or orientation of the system;
    a geographic database;
    a processor coupled with the positioning system and the geographic database; and
    a vehicle positioning computer program executable by the processor to cause the processor to:
        perform a map matching analysis to determine a closest point to a vehicle position on a polyline representation of a road derived from one or more Bezier curves stored in a geographic database;
        identify a Bezier curve in the geographic database corresponding to the closest point to the vehicle position on the polyline;
        project the closest point to the vehicle position on the polyline onto the identified Bezier curve to obtain an approximation of the vehicle position; and
        provide the approximation of the vehicle position to at least one driver assistance application.

12. The system of claim 11, wherein the vehicle positioning computer program is further executable by the processor to cause the processor to:
    obtain B-spline road geometry associated with road segments representing a road network in a geographic area surrounding the vehicle position;
    convert the B-spline road geometry to Bezier curves;
    divide the Bezier curves at a point located on the Bezier curve at a furthest distance from a control polygon base chord; and
    store the divided Bezier curves in the geographic database.

13. The system of claim 12 wherein the stored divided Bezier curves each comprise end points and internal control points, the vehicle positioning computer program is further executable by the processor to cause the processor to derive the polyline representation by connecting the end points of the Bezier curves while ignoring the internal control points.

14. The system of claim 13 wherein the vehicle positioning computer program is further executable by the processor to cause the processor to derive the polyline representation in real time.

15. The system of claim 11 wherein the system comprises a map and positioning engine.

16. The system of claim 11 wherein the vehicle positioning computer program is further executable by the processor to cause the processor to compute a lookup table on the fly to associate the Bezier curve with the polyline representation.

17. The system of claim 16 wherein the vehicle positioning computer program is further executable by the processor to cause the processor to use the polyline representation a length along the polyline representation in the lookup table to identify the corresponding Bezier curve.

18. The system of claim 11 wherein the vehicle positioning computer program is further executable by the processor to cause the processor to solve a cubic equation numerically using a combination of Newton's and bisection methods.

19. The system of claim 11 further comprising the vehicle positioning computer program is further executable by the processor to cause the processor to provide the polyline representation the vehicle position approximation to one or more of driver assistance applications via an interface therewith.

20. A map and positioning engine for use in an advanced driver assistance system for generating an approximation of vehicle position for use by a driver assistance application, the map and positioning engine comprising:
    a positioning system;
    a processor coupled with the positioning system;
    a vehicle positioning computer program executable by the processor to cause the processor to:
        perform a map matching analysis to determine a closest point to a vehicle position on a polyline representation of a road derived from one or more Bezier curves stored in a geographic database;
        identify a Bezier curve in the geographic database corresponding to the closest point to the vehicle position on the polyline;
        project the closest point to the vehicle position on the polyline onto the identified Bezier curve to obtain an approximation of the vehicle position; and
        provide the approximation of the vehicle position to at least one driver assistance application.

\* \* \* \* \*